April 30, 1946.   C. S. SCHROEDER   2,399,605
MOTORIZED LIFT TRUCK
Filed Feb. 18, 1942   4 Sheets-Sheet 1
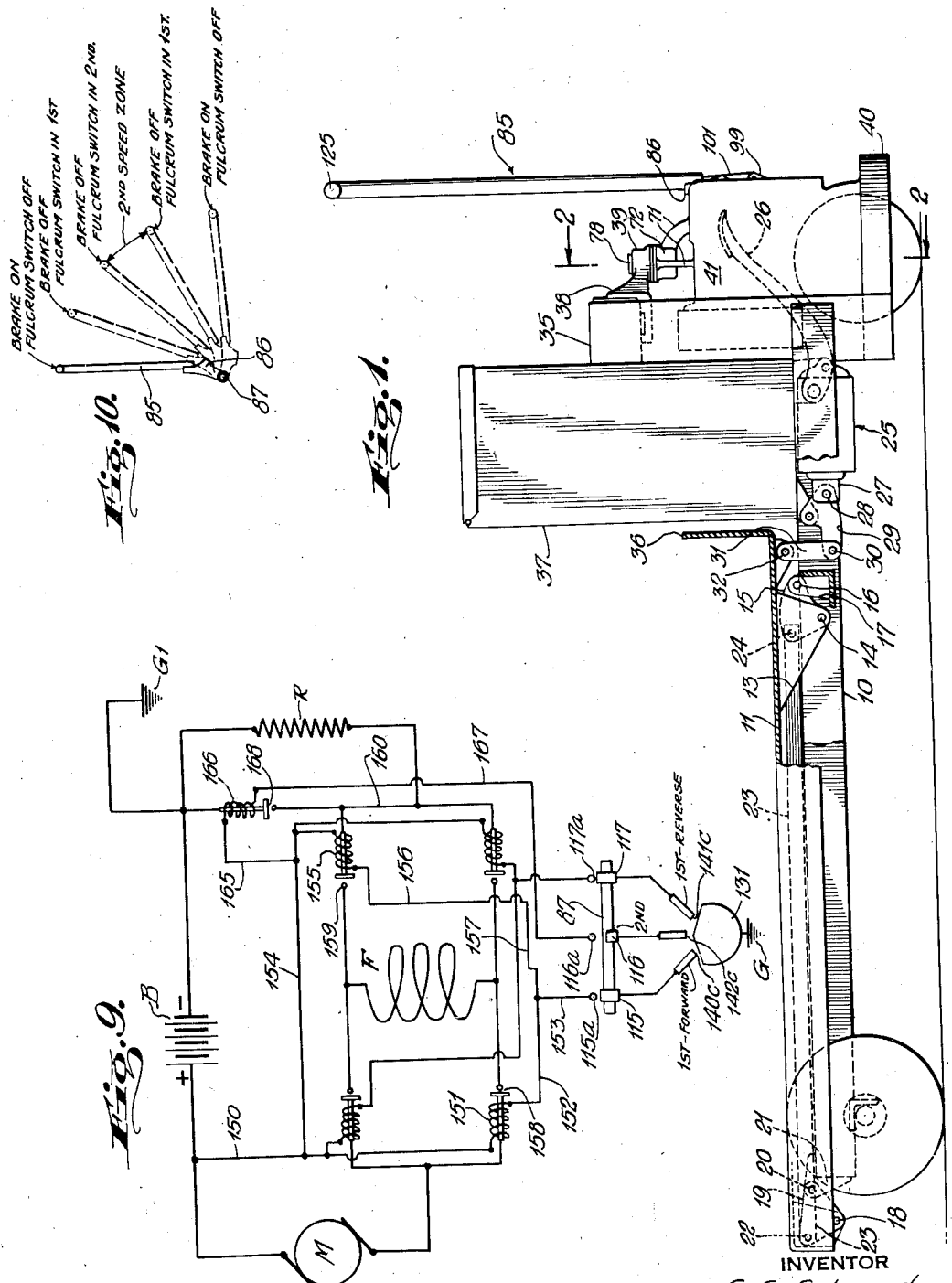
INVENTOR
C. S. Schroeder
BY A. H. Golden
ATTORNEY

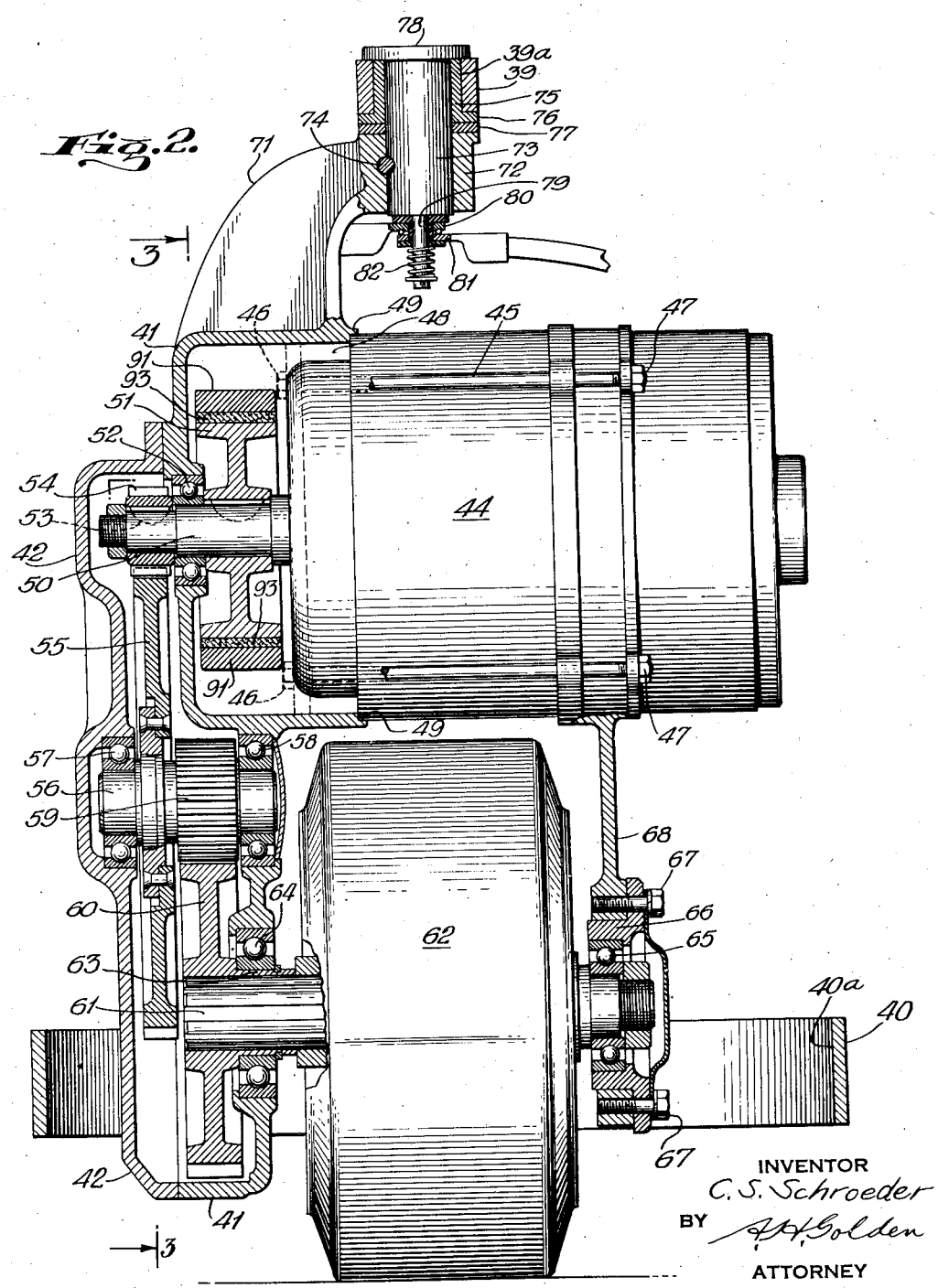

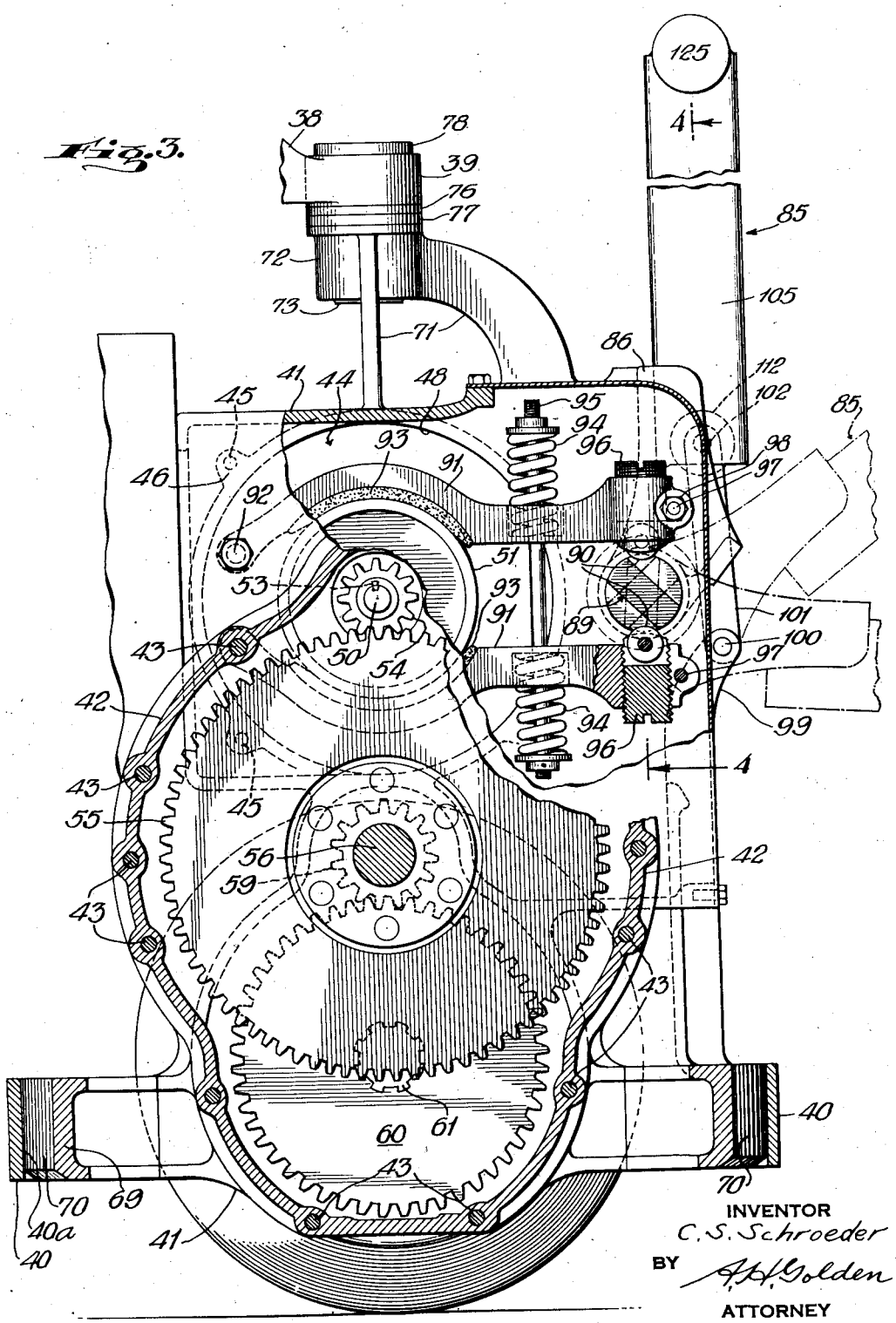

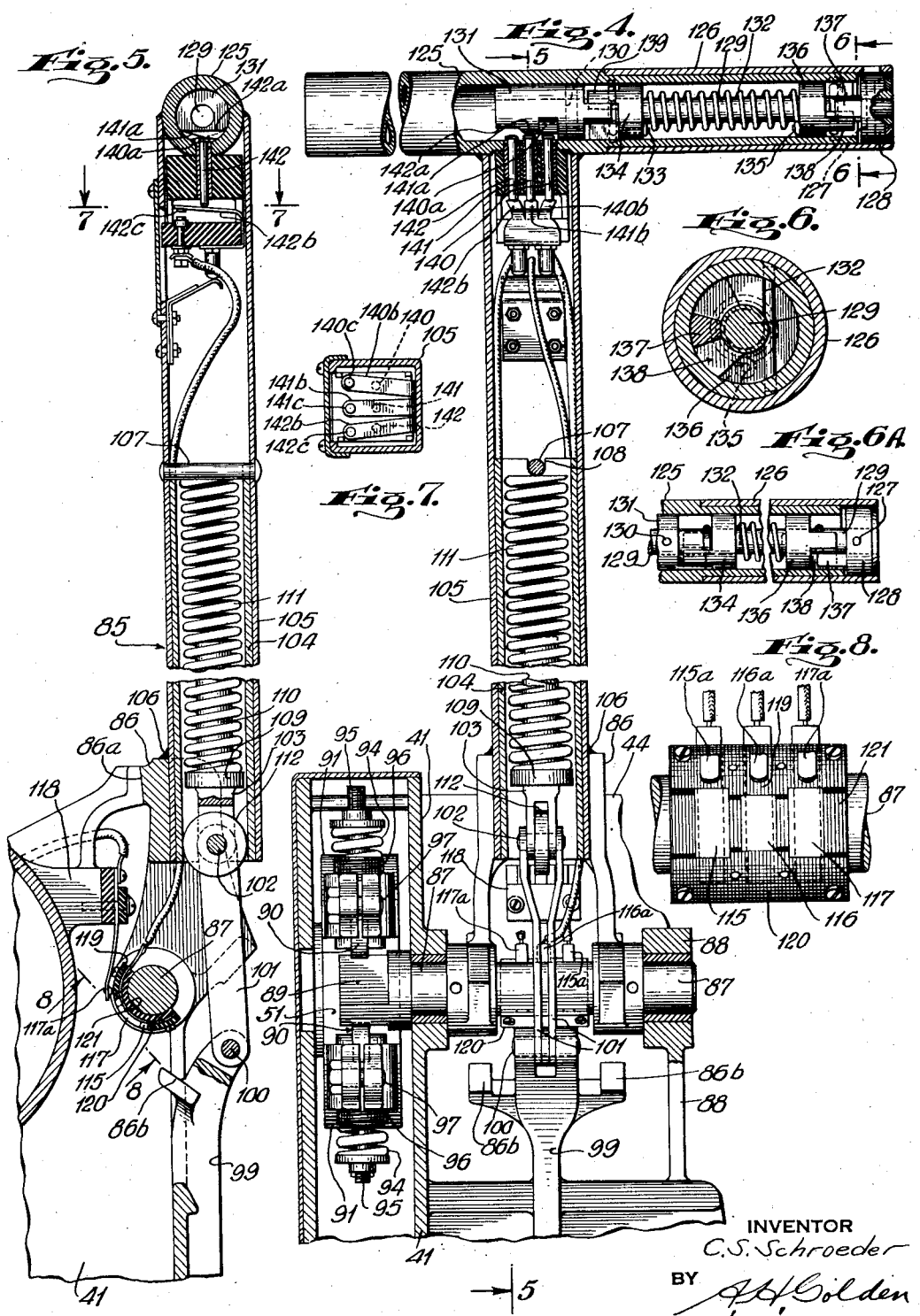

Patented Apr. 30, 1946

2,399,605

UNITED STATES PATENT OFFICE 2,399,605

MOTORIZED LIFT TRUCK

Charles S. Schroeder, Philadelphia, Pa., assignor to The Yale & Towne Manufacturing Company, Stamford, Conn., a corporation of Connecticut Application February 18, 1942, Serial No. 431,356

25 Claims. (Cl. 180—65)

This invention relates to a lift truck of the type which is propelled by a motor, and more particularly, a truck of the type in which a lever controls the motor, the lever in most cases functioning as the steering lever of the truck. Such trucks are usually termed motorized lift trucks.

Trucks of this general type are well known in the art, and generally employ a main frame relatively to which is supported a steering head, a steering lever being pivoted for vertical swinging movement on the steering head, and used for rotating the steering head to direct the truck. In some motorized lift trucks the steering head is equipped with a motor which through suitable transmission means drives the steering wheel and thus propels the truck. In others, the rear wheels are driven by the motor.

The truck of my invention preferably utilizes that construction in which the motor is carried on the steering head, there being a novel form of mounting for the steering head on the main frame. More particularly, this mounting includes an upper vertical guide and thrust bearing in the steering axis, and a lower guide bearing for the lower portion of the steering head adapted to accept lateral thrusts applied against the steering wheel.

An important feature of my invention is the control of the electric circuit of the traction motor by the vertical swinging movement of the steering lever. As a feature of my invention, the steering lever is adapted to condition the circuit so that the motor will not be energized when the steering lever is in what I term a vertical zone, or when it is in what I shall term a horizontal zone. Because of this construction, when the steering lever is moved to a vertical position by its spring, or because it overruns the position of the operator, the motor will be shut off. Similarly, should the usual steering lever balancing spring be broken, or should for some other reason the steering lever be moved to a horizontal position, as may happen when the truck is moving on a steep grade, the motor will be shut off. The controls thus outlined form therefore a very important contribution of my invention.

Still a further feature of the control of the traction motor and its electric circuit by the steering lever, resides in means whereby the steering lever conditions the electric circuit for first speed operation when the steering lever moves from either its vertical or horizontal zones toward what I shall term a central or second speed zone. A further feature is the conditioning of the circuit for second speed operation of the traction motor when the steering lever is actually positioned in its second or central speed zone.

A still further feature of my invention resides in the particular type of mechanism through which the steering lever conditions the circuit of the traction motor. More particularly, this mechanism is mounted for movement in the axis wherein the steering lever is pivoted, and preferably may form in effect, a continuation of the pivot shaft itself.

For determining the directional movement of my lift truck, and for assisting in the controlling of the traction motor, I utilize manually operated means which are located at the handle end of the steering lever. These manually operated means preferably take the form of switch mechanism for particularly conditioning the electric circuit or circuits of the traction motor when operated in a particular predetermined manner. It is a feature of this portion of my invention that the manually operated means close one switch as a requisite for the conditioning of the circuit of the traction motor for first speed operation, and that a second switch is closed as a requisite for second speed operation of the traction motor. Naturally, a duplicate operation is provided for each direction of the traction motor.

More particularly, the switches operated by the steering lever and by the manually operated means for effecting first speed operation of the traction motor, are preferably in series, although other interlocks are possible, so that both switches must be closed before the motor will operate in first speed. Similarly, the two switches whereby the second speed circuit is closed by the steering lever and the manually operated means, are also in series or otherwise interlocked. It is therefore impossible to start the traction motor other than in first speed. Still a further feature of this portion of my invention resides in the construction whereby both first speed switches are held closed when the second speed switches are closed, so that any sequential operation of the steering lever and the manually operated means will effect the first speed operation, and then the second speed operation of the traction motor. Even more particularly, the second speed switches are adapted to shunt out a traction resistance, and but one second speed switch is required for both directional circuits.

As a further feature of my invention, I have developed a novel form of brake control whereby the brake is applied when the steering lever is in its vertical zone and in its horizontal zone and whereby the brake is released just prior to the closing of the first speed circuit by the movement of the steering lever to first speed closing position from either its vertical or its horizontal zone.

As still a further feature of my invention the brake which I employ is mounted within the casing to which the motor is assembled and in which the transmission means between the motor and the traction wheels are housed. It is a particular feature of my invention that the brake be operated by means lying within the casing in which the brake is housed, and as a still further feature said means are movable in the axis in which the steering lever is pivoted on the steering head. More in detail, the brake actuating means may comprise a cam formed as an extension of the shaft on which the steering lever is pivoted, and even more particularly, this shaft may also carry the contact means through which my steering lever controls the motor circuits.

I have thus described my invention generally in order that its construction and operation will be better understood, and that the relation of my contribution to the prior art may be better comprehended. Naturally, I consider my contribution to the art a broad one, and I do not wish to be limited in my patent claims to the particular form of my invention to be described in this application. Also, there are several features of my invention described more in detail hereinafter, but not outlined generally by me, which are important parts of my invention and will be claimed broadly.

Referring now to the drawings, Fig. 1 is a vertical view of the lift truck of my invention with certain parts broken away. Fig. 2 is a section taken along lines 2—2 of Fig. 1. Fig. 3 is a section taken along lines 3—3 of Fig. 2. Fig. 4 is a section taken along lines 4—4 of Fig. 3. Fig. 5 is a section taken along lines 5—5 of Fig. 4. Fig. 6 is a section taken along lines 6—6 of Fig. 4. Fig. 6A is a view of parts of Fig. 4 in a different operating position. Fig. 7 is a view along lines 7—7 of Fig. 5. Fig. 8 is a view taken along lines 8—8 of Fig. 5. Fig. 9 is a schematic layout of the electric circuit of the truck. Fig. 10 is a view illustrating the various zone positions of the steering lever indicating the controls which result in the several zones.

Referring now more particularly to the drawings and especially Fig. 1, I show a truck having a main frame 10 on which is supported an elevating platform 11. The platform 11 has gussets 13 at each side thereof pivoted at 14 to links 15. The links 15 are in turn pivoted at 16 to supports 17 forming part of the main frame. The rear end of the elevating platform 11 has pivotally connected thereto at 18, links 19 similar in construction to the forward links 15, and similarly mounted at 20 on supports 21 of the main frame. The rear links 19 are pivoted at 22 to horizontally extending rods 23 which are pivoted at 24 to the forward links 15. Those skilled in the art will now readily appreciate that as the platform 11 is elevated through suitable mechanism to be described presently, its front and rear ends will move simultaneously on the links 15 and 19 through the operation of the rods 23 connecting those links.

For imparting upward lifting movement to the elevating platform 11 I utilize a hydraulic mechanism designated generally by reference numeral 25, and adapted for operation by a foot treadle 26. This type of mechanism is well known in the art, so that its operation and construction need not here be more particularly illustrated and described. It is only necessary to indicate that the ram 27 of the hydraulic mechanism is pivoted at 28 to a bell crank 29 which in turn is pivoted at 30 to the link 31, and that the link 31 is pivoted at 32 to the elevating platform 11. It is obvious now, that movement to the left of the ram 27 will effect upward lifting movement of the front end of the elevating platform, and therefore of the rear end of the platform at the same time.

The forward end of the main frame is preferably formed with a vertical standard designated generally by reference numeral 35, and mounted on the main frame 10 between the standard 35 and the flange 36 of the elevating platform 11, is a battery compartment 37 in which is adapted to rest a battery for supplying the electric power required by the traction motor of my truck. The standard 35 has extending therefrom an arm 38 which terminates at 39 in a bearing support as best illustrated in Figs. 2 and 3. The lower portion of the standard 35 has welded thereto a circular member 40, the inside surface of which is formed as a guide and lateral thrust accepting surface for a bearing portion of the steering head to be described presently.

The steering head of my invention is best illustrated in Figs. 2 and 3 wherein it will be noted that it comprises a main casting 41 and a cover casting 42 secured to the main casting 41 by a series of bolts 43 shown in Fig. 3. The drive motor to which I have already referred generally is designated by reference numeral 44 and is secured by a series of rods 45 and nuts 46 and 47 in assembled relation to the main casting 41, and in closing relation to an opening 48 of the said main casting defined by a flange 49 against which the casing of the motor 44 rests when assembled to the main casting 41.

The motor shaft is designated by reference numeral 50 and has keyed thereto a brake drum 51. The shaft 50 is supported on the ball bearing 52 carried by the main casting 41, and extends toward the cover casting 42. It has keyed thereto at 53 a pinion 54 which is in driving engagement with a gear 55 supported on a shaft 56. The shaft 56 is mounted on a ball bearing 57 relatively to the cover casting 42, and a ball bearing 58 relatively to the main casting 41, and has fixed thereto the pinion 59. This pinion 59 is in driving engagement with the gear 60, and the gear 60 is in splined relation to the shaft 61 on which is suitably supported the steering and traction wheel 62 of my truck. The shaft 61 is suitably mounted at one end through the flange 63 of the gear 60, on ball bearing 64 carried by the main casting 41. The other end of the shaft is mounted through ball bearing 65 relatively to a bearing support 66 which is secured by a series of bolts 67 relatively to the casting 68 forming a part of the main casting 41. Those skilled in the art will readily appreciate that by removal of the several bolts 67, the bearing support 66 may be removed to allow the outward sliding of the splined shaft 61 from its bearing in the wheel 62 and its bearing in flange 63 of the gear 60. This simple operation allows for the ready removal of wheel 62 and is highly desirable in a truck of this type, as will be appreciated by those skilled in the art.

Secured to, and forming a part of the main casting 41 is the lower bearing casting 69 whose outward circular surface 70 is adapted to rotate relatively to the inner surface 40a of the circular main frame bearing 40. In this way, all lateral thrusts against the lifting head and traction wheel 62 will readily be accepted by the main frame, and in a most desirable manner.

Formed as an integral part of the main casting 41 is the arm 71 which terminates at 72 in a bearing support lying directly under the bearing support 39 of the main frame, all as is best seen from Figs. 2 and 3. A headed vertical shaft 73 traverses a bore in the bearing member 72 formed in the steering axis of the truck, and is secured to bearing member 72 by the pin 74. The shaft 73 traverses a bushing 75 mounted in the bore 39a of the bearing 39, the bushing 75 being flanged at 76 for cooperation with a thrust washer 77 resting on the upper surface of the bearing member 72. It is now quite obvious that the means thus described accept the vertical thrust of the steering head relatively to the main frame, and suitably support the steering head for rotation in the steering axis. The upper end of the shaft 73 is formed with a head 78 which effectively prevents the entrance of foreign material into its bearings.

If desired, the shaft 73 may be formed with a depending pin portion 79 on which may be mounted the contacts 80 and 81, suitably insulated from the pin 79 and the shaft 73, and maintained in contact engagement by a spring 82 in a manner which will be quite obvious by a mere glance at the drawing of Fig. 2. The contacts 80 and 81 serve to transmit electric power from the battery to the traction motor while allowing a swiveling movement of the contacts relatively to one another as is required when the steering head is rotated to steer the truck.

Referring now more particularly to Figs. 3, 4 and 5, I show what I term a steering lever assembly designated generally by reference numeral 85. This steering lever assembly comprises a casting 86, which through the shaft 87, is suitably mounted at its left side in Fig. 4 in the main casting 41, and at its right hand side in a bearing support 88 extending upwardly and forming an integral part of the main casting. The left hand end of the shaft 87 has formed thereon a cam portion 89 which, as best shown in Figs. 3 and 4, is adapted for cooperation with rollers 90 carried by identical upper and lower brake shoes 91. These brake shoes are preferably pivotally supported on a shaft 92 and one of the bolts 43, and have brake lining 93 for application against the surface of the brake drum 51, the springs 94 mounted on the rod 95 being adapted to force the brake shoes toward the brake drum. From Fig. 3 it is quite obvious that when the steering lever 85 is swung downwardly from a vertical zone, or upwardly from a horizontal zone, the cam portion 89 operating in the axis of the pivotal mounting of the steering lever will coact with the rollers 90 to move the brake shoes 91 against the pressure of the spring 94 and away from brake drum 51. This operation of the brake shoes by a part movable in the pivot axis of the steering lever is an important contribution of my invention as already set forth.

In Fig. 10 the full vertical position is illustrated and designated as the "Brake on" position, while the next vertical position is designated as the "Brake off" position. The full horizontal position of Fig. 10 is also designated as the "Brake on" position while the "Brake off" position is the next position above. The solid line position of cam 89 in Fig. 3 corresponds to the vertical "Brake on" position, while the dotted line position of the cam in that figure represents the horizontal "Brake on" position. Those skilled in the art will fully appreciate that by a simple adjustment of the parts the point at which the brake is released may be readily changed. In my invention this may be accomplished by moving rollers 90 through rotation of the roller supporting studs 96, these studs being in screw threaded relation to the brake shoes 91, and being adapted for locking in any adjusted position to which they are moved, by the bolts 97 and the nuts 98 as will be readily understood.

Extending from the main casting 41 there is a bifurcated bearing arm 99 to which is pivoted at 100 a pair of links 101 that are in turn pivoted through pin 102 relatively to a casting 103 mounted for sliding movement within the inner tube 104 of the lever assembly. The tube 104 is in turn mounted within the outer tube 105 which forms the main portion of the steering lever assembly 85, and for that purpose is welded at 106 to the casting 86. A pin 107 extends across the tube 105 and is riveted to that tube as best illustrated in Fig. 5. The inner tube 104 is cut out at 108 for the pin 107. The casting 103 is formed with a flange 109 and a spring guiding pin 110, a spring 111 being mounted about said pin and pressing at one end against the flange 109, and at its other end against the pin 107. A guide roller 112 is mounted about pin 102, and rolls within the inner tube 104 so as to provide a non-friction guide for the casting 103 in the tube 104, as the steering lever 85 is swung downwardly to compress the spring 111.

As will be readily understood it is the function of the spring 111 to maintain the steering lever 85 in its vertical position and to oppose the downward swinging movement of that lever. In the art, the spring 111 is termed a steering lever balancing spring. The upper vertical position of the steering lever is determined by the surface 86a on the casting 41 against which the casting 86 rests in Fig. 5, while the lower horizontal position is determined by lugs 86b formed on bearing arm 99.

The shaft 87 which is movable in the axis of the pivotal mounting of the steering wheel assembly and preferably supports the steering lever assembly 85 through its casting 86, is suitably formed at its center, as best illustrated in Figs. 4, 5 and 8, to carry separated contact segments 115, 116 and 117. These segments are adapted for coaction respectively with contact fingers 115a, 116a and 117a which are supported on the lug 118, formed as part of the main casting 41 of the steering head. It will be noted that insulation members 119 and 120 bound respectively the upper and lower ends of the several segments 115, 116 and 117 as best shown in Fig. 5, and that the said segments are suitably insulated from the shaft 87 through the further insulation member 121. The relation of the said segments and contact fingers is such that in the vertical position of the steering lever, illustrated in Fig. 5, all the contact fingers will bear against the insulation member 119. Similarly, when the steering lever is in its full horizontal position, all the contact fingers will bear against the insulation member 120.

It will be further understood that when the steering lever 87 is moved downwardly or upwardly from its full vertical or full horizontal position, that is, from its vertical and horizontal zones, the fingers 115a and 117a will first contact the segments 115 and 117. Thereafter, by further rotation to what I term the central zone of the steering lever, the contact finger 116a will engage segment 116. Later in this specification, I shall describe the manner in which the particular construction which I have just described is utilized.

Referring now to Figs. 4, 5, 6, 6a and 7, it will be noted that there is secured to the outer tube 105 of the steering lever assembly 85 a tubular handle 125. The right hand end of the handle 125 is machined away to provide a bearing for a rotating grip sleeve 126 which is bolted by the bolt 127 to a disc 128 splined onto the shaft 129. The shaft 129 is in turn pinned at 130 to a switch actuator 131. A spring 132 surrounds the shaft 129 and is secured at one end at 133 to what I term a limit 134, and is secured at its other end 135 to a limit 136. The disc 128 has a lateral arm 137 fitting against a lateral arm 138 on the limit 136. The limit 134 has a lateral arm 139 against which fits a lateral arm on the switch actuator 131. The limit 134 is suitably prevented from rotating in one direction in the tubular handle 125 while being free to rotate in a reverse direction. The limit 136 is similarly controlled, but is free for rotating in that direction against which the limit 134 is prevented from rotating.

Through this construction of the parts, when the grip sleeve 126 is rotated in one direction, its arm 137 cooperates with arm 138 and rotates the limit 136 against the pressure of spring 132. When the grip sleeve is released, the spring 132 works through the limit 136 and the lateral arms 137 and 138, to return the grip sleeve to its normal position. When the grip 126 is rotated in a reverse direction, a similar action is obtained, but with limit 134 being rotated while limit 136 remains fixed, all as will be fully appreciated.

I lay no particular emphasis on this structure, since I appreciate that it is old in the art to have a centering contact operating grip sleeve. I do consider of importance, however, the manner in which the switch actuator 131 effects the closing of several circuits by the three contact pins 140, 141 and 142 when the grip sleeve 126 is rotated. As is best shown in Figs. 4 and 5, the switch actuator 131 has one cam surface 140a cooperating with the pin 140, a similar surface 141a oppositely located for cooperating with the pin 141, and a third cam surface at 142a for coaction with pin 142. The rotation of the grip sleeve in one direction first moves the switch actuator 131 so that its surface 140a forces the pin 140 downwardly into contact with a spring finger 140b, closing a switch at 140c. Further rotation of the grip sleeve 126 in the same direction, rotates the switch actuator 131, which through its cam surface 142a and spring finger 142b closes a circuit at 142c.

When the grip sleeve 126 is rotated in a reverse direction it will obviously first close a circuit through pin 141 and spring finger 141b to close a circuit at 141c. Further rotation in the same direction will then effect the closing of the circuit at 142c. It is felt that this explanation of the mechanical operation of the switch closing means carried by the handle and the steering lever is sufficient for an understanding of the mechanical functioning of my structure. The functional operation of the several parts I have outlined, is the really important feature of my invention and that is best understood by reference to Fig. 9.

Referring now to Fig. 9, the several switches previously described are therein designated by the same reference numerals as previously used. The motor will be designated however by the reference letter M while the field coil carries reference letter F. The traction resistance is designated by the reference letter R, and the battery by the reference letter B. The two grounds will be designated "G" and "G₁." In the position of the parts in Fig. 9, the shaft 87 forming the fulcrum of the steering lever assembly 85, is positioned in its vertical or horizontal zone, so that the contact segments 115, 116, and 117 are out of the plane of the contact fingers 115a, 116a and 117a, and so that no circuit is closed through the said fingers and segments. Similarly, switch actuator 131 is so positioned by the spring 132 of the grip sleeve 126, that no circuit is made at points 140c, 141c and 142c. Therefore, no current will flow through the motor M and its field coil F.

Should the steering lever now be moved vertically upward from the horizontal zone or downwardly from the vertical zone towards the central zone, a circuit will be closed between the segment 115 and finger 115a, and also between the segment 117 and finger 117a. If the operator wishes the truck to go forward, he may, either before or after swinging the handle, rotate the grip sleeve 126 and switch actuator 131 to close a circuit at either 140c or 141c. If he closes the circuit at 140c, current will flow from the plus side of the battery through conductor 150, contactor coil 151, conductors 152 and 153, finger 115a, segment 115 and through the circuit at 140c to the ground G. Current will also flow through the conductor 150, the conductor 154, the contactor coil 155, conductors 156, 157 and 153, finger 115a, segment 115 and the circuit at 140c to the ground G. The pull of the contactor coils 151 and 155 will effect the closing of circuits at 158 and 159. Current will now flow from the plus side of the batery through the motor M, contacts 158, field coil F, contacts 159, conductor 160, resistance R and back to the minus side of the battery or ground G. In other words, the motor will be actuated in first speed.

If the steering lever is moved downwardly towards its central zone, indicated as the second speed zone in Fig. 10, a circuit will be closed between the contact 116 and the finger 116a. If, at the same time, the grip 126 is rotated further, a circuit will also be closed at 142c. At the same time, of course, the circuit at 115, 115a and 140c will remain closed. The closing of the circuit at 116, 116a will cause current to flow from the battery through the conductors 150, 154, and 165, through the contactor coil 166, conductor 167 to finger 116a, 116, the circuit at 142c to the ground G. The energizing of the contactor 166 effects the closing of the circuit at contacts 168. Current will now flow from the plus side of the battery through the motor M, contacts 158, field coil F, contacts 159, contacts at 168, and back to the ground G, or the minus side of the battery. The effect, of course, of this last conditioning of the motor circuit, is to shunt out the resistance, thereby placing the motor in second speed.

It will now be readily appreciated that the motor can be placed in first speed only by the simultaneous vertical swinging movement of the steering lever to a particular position, and a particular operation of the manual means at the handle end of the steering lever. It is further appreciated that second speed is obtained by the further swinging of the steering lever and the further operation of the manual means at the handle. Because of the arrangement of the several parts, it is understood that if the steering lever is in its second speed zone, and the grip sleeve switch has not as yet been operated, the motor must still pass through its first speed to get to its second speed. The same is true if the handle switch is moved to second speed position while the steering lever is in its vertical position, the downward swinging movement of the steering lever then first effecting the closing of the first speed circuit, and thereafter the closing of the second speed circuit. I do not deem it necessary to describe the operations required to reverse the motor since they are exactly the same as are required to place the motor in a forward speed position.

I do not believe it necessary to further emphasize the relation between my switch operating means and the brake operating mechanism, since that has already been set forth, and is very readily appreciated from a simple examination of Fig. 10. I believe also that it will be unnecessary at this point to review in further detail the operation of my invention as that operation has now been very fully set forth.

I now claim:

1. In a truck of the class described, a steering head having a steering wheel and rotatably mounted on said truck, a power mechanism on said steering head for driving said steering wheel to propel said truck, a brake for said power mechanism, a steering lever pivoted on said steering head for vertical swinging movement while adapted to rotate said steering head, a brake shaft mounted on said steering head for movement bodily in the axis of the pivotal mounting of said steering lever and having a cam surface thereon, means of connection whereby said brake shaft is moved in said axis by the vertical swinging of said steering lever, said cam surface moving said brake into release position when said steering lever is positioned between a vertical zone and a horizontal zone, and said cam surface releasing said brake for application when said steering lever is in its vertical zone and also when it is in its horizontal zone.

2. In a truck of the class described, a steering head rotatably mounted on said truck and having a steering wheel, a motor unit for driving said wheel to propel said truck, a brake drum on said motor unit, a pair of brake shoes for said drum, a steering lever rotatably mounted about a fixed horizontal axis on said steering head for vertical swinging movement, a cam extending from said steering lever in said fixed axis, and a part of each of said brake shoes positioned in said fixed axis in juxtaposed relation to said cam for operation by said cam upon rotation of said steering lever.

3. In a truck of the class described, a steering head rotatably mounted on said truck and having a steering wheel, a power drive for said steering wheel including a motor and speed reducing means, a casing for said speed reducing means to which said motor is secured, a brake drum for said motor housed within said casing, brake shoes for said drum within said casing, a steering lever rotatably mounted about a fixed horizontal axis on said steering head for vertical swinging movement, a shaft secured to said steering lever for rotation therewith in said axis and extending into said casing, and a cam formed on that portion of said shaft within said casing and adapted to actuate said brake shoes.

4. In a truck of the class described, an electric power drive for said truck, a steering lever for said truck pivotally mounted for vertical swinging movement on said truck, a member movable bodily in the pivot axis of said steering lever, switch means for said electric power drive movable with said member bodily in said pivot axis, and a connection between said member and said steering lever whereby said member is moved in said pivot axis as said steering lever is swung vertically.

5. In a truck of the class described, an electric power drive for said truck, a steering lever for said truck pivotally mounted for vertical swinging movement on said truck, a member movably bodily in the pivot axis of said steering lever, contact elements for said electric power drive secured for rotation with said member, relatively stationary elements on said truck cooperable with said contact elements, and a connection between said member and said steering lever whereby said member rotates with said steering lever in said pivot axis.

6. In a truck of the class described, a steering head, a steering lever, a pivot shaft whereby said steering lever is mounted for vertical swinging movement on said steering head, an electric traction motor for said truck, contact elements on said truck, and contact segments on said pivot shaft and rotatable therewith by said steering lever for cooperating with said contact elements to control the actuation of said electric traction motor.

7. In a truck of the class described, an electric power drive for said truck, a steering lever for said truck pivotally mounted for vertical swinging movement on said truck, switch means for said electric power drive operated by swinging movement of said steering lever and positioned to stop the actuation of said electric power drive when said steering lever is in its vertical zone and in its horizontal zone, said switch means effecting the actuation of said electric drive in first speed when said steering lever moves toward a central zone from either its vertical zone or its horizontal zone, and means whereby said switch means effects the actuation of said electric drive at a second speed when said steering lever is in its central zone.

8. In a truck of the class described, an electric motor for propelling said truck, a source of electric power for said motor, a resistance, a steering lever for said truck pivotally mounted for vertical swinging movement on said truck, switch means for said electric motor operated by swinging movement of said steering lever and positioned to maintain said electric motor out of contact with said electric power source when said steering lever is in a vertical and in a horizontal zone, said switch means effecting the connection of said motor to said power source through said resistance when said steering lever moves toward a central zone from either its vertical zone or its horizontal zone, and means whereby said switch means effects the shunting out of said resistance when said steering lever is in its central zone.

9. In a truck of the class described, a steering head, a steering lever, a pivot shaft whereby said steering lever is mounted for vertical swinging movement on said steering head, an electric traction motor for said truck, contact segments on said pivot shaft and rotatable therewith by vertical swinging of said steering lever, relatively stationary contact elements cooperable with said contact segments, a circuit for controlling the actuation of said motor closed through one of said segments when said lever is placed in one position, and a second circuit closed through another of said segments when said steering lever is placed in a second position, said segments being out of circuit closing position when said lever is in a third position.

10. In a truck of the class described, an electric motor drive for said truck, a steering lever for said truck mounted for vertical swinging movement on said truck, switch means for said electric motor drive, means movable with said steering lever and operable by vertical swinging movement of said steering lever to actuate said switch means so that said electric motor drive will be actuated when said steering lever is positioned between a vertical zone and a horizontal zone, and said electric motor drive will be stopped when said steering lever is moved into said vertical zone or into said horizontal zone.

11. In a truck of the class described, an electric motor for propelling said truck, a circuit for said electric motor having two control points, both of which must be particularly conditioned before said circuit is closed, a steering lever for said truck pivotally mounted thereon for vertical swinging movement, a switch for controlling the conditioning of said circuit at one of said points, contact means rotatable bodily with said steering lever in the pivot axis of said steering lever for closing and opening said switch as said steering lever is swung vertically on its pivotal mounting, and a second switch located at the handle end of said steering lever for controlling the conditioning of said circuit at the other of said points.

12. In a truck of the class described, an electric motor for propelling said truck, an electric circuit the conditioning of which controls the running and speed of said motor, a steering lever for said truck pivotally mounted for vertical swinging movement on said truck, means for controlling said electric motor circuit operated by swinging movement of said steering lever and positioned to condition said electric motor circuit to stop said motor when said steering lever is in its vertical zone, said means effecting the conditioning of said electric circuit when said steering lever moves toward a central zone whereby said motor is in first speed, said means conditioning said electric circuit when said steering lever is in its central zone so that said motor is in second speed, and a manually operated means at the handle end of said steering lever the movement of which to one position is a requisite to the conditioning of said circuit by said first means for first speed operation of said motor, and the movement of which to a second position is a requisite to the conditioning of said motor for second speed operation by said first means.

13. In a truck of the class described, an electric motor for propelling said truck, an electric circuit the conditioning of which controls the running and speed of said motor, a steering lever for said truck pivotally mounted for vertical swinging movement on said truck, means for controlling said electric motor circuit operated by swinging movement of said steering lever and positioned to condition said electric motor circuit to stop said motor when said steering lever is in its vertical zone, said means effecting the conditioning of said electric circuit when said steering lever moves toward a central zone whereby said motor is in first speed, said means conditioning said electric circuit when said steering lever is in its central zone so that said motor is in second speed, and a manually rotated means at the handle end of said steering lever the rotation of which a particular amount in either of opposite directions is a requisite to the conditioning of said circuit by said first means for first speed operation in a direction dependent on the direction of rotation of said manually rotated means, and means whereby the further rotation of said manually rotated means is a requisite to the conditioning of said circuit by said first means for second speed operation.

14. In a truck of the class described, an electric motor for propelling said truck, an electric circuit for said motor the condition of which determines the running and the speed of said motor, a steering lever for said truck pivotally mounted for vertical swinging movement, a manually operated device at the handle end of said steering lever, means for conditioning said circuit in first speed requiring both the movement of said steering lever from a vertical zone toward a central zone, and the particular movement of said manual means, means for conditioning said circuit for second speed requiring both the further movement of said steering lever and particular movement of said manual means, the said lever and manual means being so constructed that the movement of either said lever or said manual means to said second speed circuit conditioning position in advance of the other, conditions said circuit as determined by the position of the last moved.

15. In a truck of the class described, an electric motor for propelling said truck, an electric circuit for said motor the condition of which determines the running and the speed of said motor, a steering lever for said truck pivotally mounted for vertical swinging movement, a manually operated device at the handle end of said steering lever, a pair of switches adapted for closing by vertical swinging of said steering lever, a pair of switches adapted for closing by movement of said manual means, means whereby the simultaneous closing of one switch of each of said pairs of switches conditions said electric circuit for first speed movement of said motor, and means whereby the simultaneous closing of the other of each of said pairs of switches conditions said electric circuit for second speed operation.

16. In a truck of the class described, an electric motor for propelling said truck, an electric circuit for said motor the condition of which determines the running and the speed of said motor, a steering lever for said truck pivotally mounted for vertical swinging movement, a manually operated device at the handle end of said steering lever, a pair of switches adapted for sequential closing by vertical swinging of said steering lever, a pair of switches adapted for sequential closing by movement of said manual means, means whereby the simultaneous closing of the first switch of each of said pairs of switches conditions said electric circuit for first speed movement of said motor, means whereby the simultaneous closing of the second switch of each of said pairs of switches while maintaining said first switches closed, conditions said electric circuit for second speed operation, while the closing of the first switch of one of said pairs of switches simultaneously with the first and second switches of the other of said pairs of switches conditions said electric circuit for first speed operation.

17. In a truck of the class described, an electric motor for propelling said truck, an electric circuit for said motor the condition of which determines the running and the speed of said motor, a steering lever for said truck pivotally mounted for vertical swinging movement, a manually operated device at the handle end of said steering lever, a first speed control circuit for conditioning said electric circuit for first speed operation, a second speed control circuit for conditioning said electric circuit for second speed operation, a pair of switches in series in each of said control circuits, and means whereby one of each of said pairs of switches is operated by said steering lever and by said manual means.

18. In a truck of the class described, an electric motor for propelling said truck, an electric circuit for said motor the condition of which determines the running and the speed of said motor, a steering lever for said truck pivotally mounted for vertical swinging movement, a manually operated device at the handle end of said steering lever, a first speed control circuit for conditioning said electric circuit for first speed operation, a second speed control circuit for conditioning said electric circuit for second speed operation, a pair of switches in series in each of said control circuits, means whereby one of each of said pairs of switches is operated by said steering lever and by said manual means, and means whereby the closing of one of the switches of the second speed control circuit, effects the closing of the corresponding switch of the first speed control circuit.

19. In a truck of the class described, an electric motor for propelling said truck, a source of electric power for said motor, and a resistance for said motor, a steering lever for said truck pivotally mounted for vertical swinging movement on said truck, switch means for said electric motor operated by swinging movement of said steering lever and positioned to maintain said electric motor out of contact with said electric power source when said steering lever is in its vertical zone, said switch means effecting the connection of said motor to said power means through said resistance when said steering lever moves toward a central zone, said switch means shunting out said resistance when said steering lever is in its central zone, and a second switch means at the handle end of said steering lever the movement of which to one position is a requisite to the closing of said circuit between said power source and motor by said first switch means, and the movement of which to a second position is a requisite to the shunting out of said resistance.

20. In a truck of the class described, an electric motor for propelling said truck, a source of electric power for said motor, and a resistance for said motor, a steering lever for said truck pivotally mounted for vertical swinging movement on said truck, switch means for said electric motor operated by swinging movement of said steering lever and positioned to maintain said electric motor out of contact with said electric power source when said steering lever is in its vertical zone, said switch means effecting the connection of said motor to said power means through said resistance when said steering lever moves toward a central zone, said switch means shunting out said resistance when said steering lever is in its central zone, and a second switch means at the handle end of said steering lever the movement of which to one position is a requisite to the closing of said circuit between said power means and motor by said first switch means, and the movement of which to a second position is a requisite to the shunting out of said resistance from said circuit, both said first and second switch means holding the first speed circuit closed when moved to resistance shunting position.

21. In a truck of the class described, an electric power drive for said truck, a steering lever for said truck pivotally mounted for vertical swinging movement on said truck, switch means for said electric power drive operated by swinging movement of said steering lever and positioned to stop the actuation of said electric power drive when said steering lever is in its vertical zone and in its horizontal zone, said switch means effecting the actuation of said electric drive in first speed when said steering lever moves toward a central zone from either its vertical zone or its horizontal zone, and said switch means effecting the actuation of said electric drive at a second speed when said steering lever is in its central zone, and a second switch means at the handle end of said steering lever the movement of which to one position is a requisite to the actuation of said electric drive at first speed, and the movement of which to a second position is a requisite to the actuation of said electric drive at second speed.

22. In a truck of the class described, a power drive for said truck, a steering lever for said truck mounted for vertical swinging movement on said truck, means whereby the swinging movement of said steering lever controls said power drive so that said drive will be actuated when said steering lever is positioned between a vertical zone and a horizontal zone, and said drive will be stopped when said steering lever is in said vertical zone and in said horizontal zone, a brake for said truck, a spring pressing said brake into braking position, a cam rotatable by said steering lever in the axis of its pivotal mounting on said truck, and means whereby said cam moves said brake into release position when said steering lever is positioned between its vertical and horizontal zones, said cam releasing said brake for application by said spring when said steering lever is in its vertical zone and also when it is in its horizontal zone.

23. In a truck of the class described, an electric motor drive for said truck, a brake for said truck, a control circuit for said electric motor, a steering lever for said truck pivoted thereon for vertical swinging movement, contact and brake control means movable bodily in the pivot axis of said lever and movable by said lever as it swings on said axis for actuating said brake and for conditioning said circuit, and relatively stationary elements on said truck cooperable with said brake and contact control means.

24. In a truck of the class described, an electric motor drive for said truck, a brake for said truck, a control circuit for said electric motor, a steering lever for said truck pivotally mounted on said truck, a shaft movable by said steering lever in the axis of its pivotal mounting on said truck, and contact and cam means movable bodily with said shaft in said axis and cooperable with relatively stationary means whereby the movement of said shaft by the pivotal swinging movement of said handle opens and closes said control circuit and effects the application and release of said brake.

25. In a truck of the class described, an electric motor drive for said truck, a brake for said truck, a control circuit for said electric motor, a steering lever for said truck pivotally mounted on said truck, a shaft movable by said steering lever in the axis of its pivotal mounting on said truck, cam means movable bodily with said shaft in said axis whereby said shaft moves said brake to release position as said steering lever moves on its pivotal mounting, electric contact elements on said truck, and electric contacts for said motor control circuit movable bodily with said shaft in said axis relatively to said electric contact elements to control said electric motor drive.

CHARLES S. SCHROEDER.